US007671950B2

(12) United States Patent
Jeon et al.

(10) Patent No.: US 7,671,950 B2
(45) Date of Patent: Mar. 2, 2010

(54) IN-PLANE SWITCHING LIQUID CRYSTAL DISPLAY COMPRISING COMPENSATION FILM FOR ANGULAR FIELD OF VIEW USING POSITIVE BIAXIAL RETARDATION FILM

(75) Inventors: Byoung Kun Jeon, Daejeon (KR); Serey Belyaev, Daejeon (KR); Jeong Su Yu, Daejeon (KR); Nikolay Malimonenko, Daejeon (KR)

(73) Assignee: LG Chem. Ltd., Seoul (KR)

( * ) Notice: Subject to any disclaimer, the term of this patent is extended or adjusted under 35 U.S.C. 154(b) by 0 days.

(21) Appl. No.: 12/285,697

(22) Filed: Oct. 10, 2008

(65) Prior Publication Data

US 2009/0115944 A1 May 7, 2009

Related U.S. Application Data

(62) Division of application No. 10/991,542, filed on Nov. 19, 2004, now Pat. No. 7,446,838.

(30) Foreign Application Priority Data

Nov. 21, 2003 (KR) ...................... 10-2003-0083023

(51) Int. Cl.
*G02F 1/1335* (2006.01)
(52) U.S. Cl. ..................................... 349/119
(58) Field of Classification Search ............... 349/117, 349/118, 119, 141
See application file for complete search history.

(56) References Cited

U.S. PATENT DOCUMENTS

| 3,807,831 | A | 4/1974 | Soref |
| 5,189,538 | A | 2/1993 | Arakawa |
| 5,440,413 | A | 8/1995 | Kikuchi et al. |
| 6,078,375 | A | 6/2000 | Matsumoto et al. |
| 6,115,095 | A | 9/2000 | Suzuki et al. |
| 6,285,430 | B1 | 9/2001 | Saito |
| 6,512,561 | B1 | 1/2003 | Terashita et al. |
| 2002/0080310 | A1 | 6/2002 | Nakamura et al. |
| 2003/0210370 | A1 | 11/2003 | Yano et al. |
| 2004/0032547 | A1* | 2/2004 | Yano et al. ............. 349/96 |
| 2004/0263731 | A1 | 12/2004 | Hata |
| 2005/0068480 | A1 | 3/2005 | Hiyama et al. |
| 2006/0098146 | A1 | 5/2006 | Yano et al. |
| 2006/0164579 | A1 | 7/2006 | Yano |

FOREIGN PATENT DOCUMENTS

| EP | 1 160 591 A1 | 12/2001 |
| EP | 1 489 437 A1 | 12/2004 |
| EP | 1 553 432 A1 | 7/2005 |
| EP | 1 586 939 A1 | 10/2005 |

(Continued)

*Primary Examiner*—Michael H Caley
(74) *Attorney, Agent, or Firm*—McKenna Long & Aldridge LLP

(57) ABSTRACT

Disclosed is an in-plane switching liquid crystal display, which uses a positive biaxial retardation film while adjusting an optical axis direction and the retardation value of the positive biaxial retardation film. The in-plane switching liquid crystal display improves the contrast characteristic at a predetermined angular position as well as at a front position thereof, so a color shift according to the viewing angle in the black state is minimized.

8 Claims, 8 Drawing Sheets

FOREIGN PATENT DOCUMENTS

| | | |
|---|---|---|
| JP | HEI 10-54982 A | 2/1998 |
| JP | HEI 11-133408 A | 5/1999 |
| JP | 11-305217 | 11/1999 |
| JP | 2002-062424 A | 2/2002 |
| JP | 2003-195310 A | 7/2003 |
| WO | WO 2004/003273 A1 | 4/2004 |

* cited by examiner

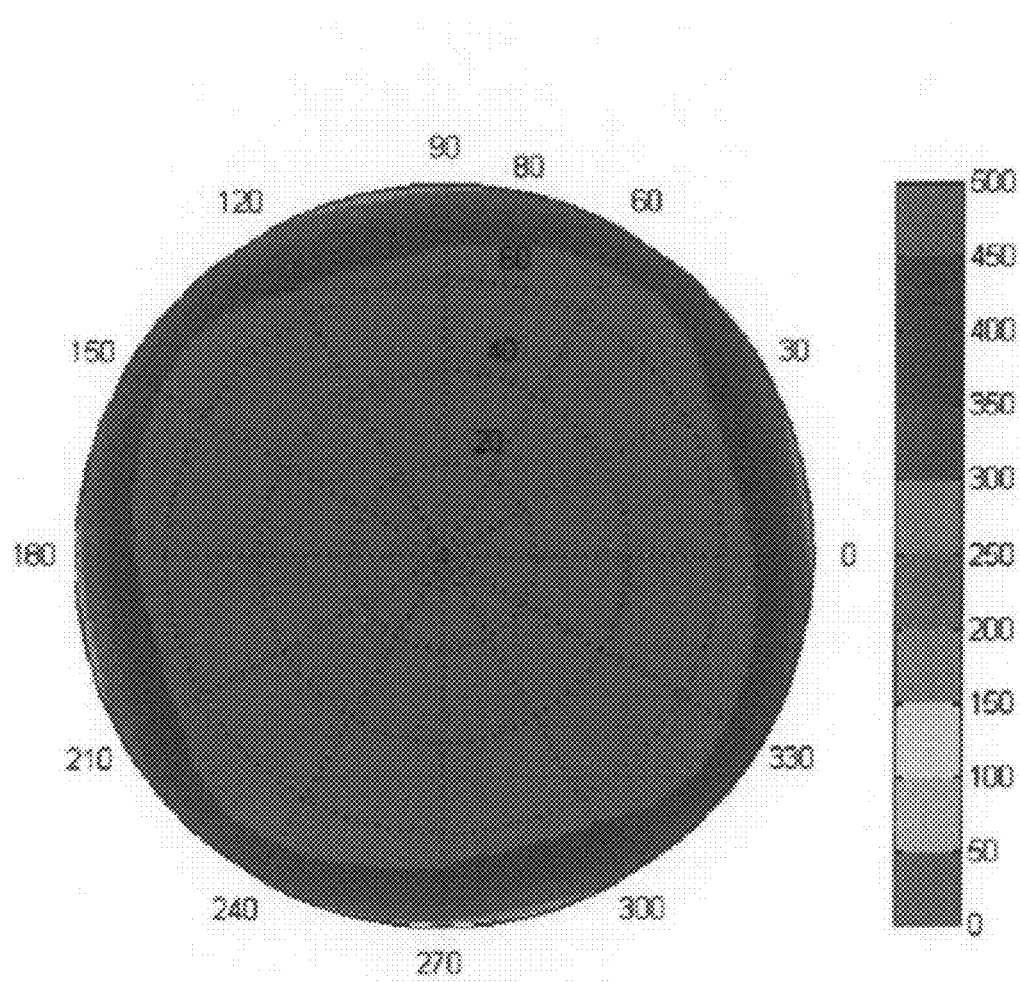

IN-PLANE SWITCHING LIQUID CRYSTAL DISPLAY COMPRISING COMPENSATION FILM FOR ANGULAR FIELD OF VIEW USING POSITIVE BIAXIAL RETARDATION FILM

This application is a divisional of application Ser. No. 10/991,542, filed Nov. 19, 2004 now U.S. Pat. No. 7,446,838, and claims the benefit of Korean Patent Application No. 10-2003-0083023, filed on Nov. 21, 2003, each of which are hereby incorporated by reference for all purposes as if fully set forth herein.

TECHNICAL FIELD

The present invention relates to a liquid crystal display (LCD), and more particularly to an in-plane switching liquid crystal display (IPS-LCD) including a compensation film, which uses a positive biaxial retardation film while adjusting an optical axis direction and a retardation value of the positive biaxial retardation film in order to improve a viewing angle characteristic of the in-plane switching liquid crystal display having a liquid crystal cell filled with liquid crystal of positive dielectric anisotropy ($\Delta \in > 0$) or negative dielectric anisotropy ($\Delta \in < 0$).

BACKGROUND ART

Electrodes of an IPS-LCD are aligned in such a manner that an electric field is applied in parallel to a liquid crystal plane of the IPS-LCD. Surfaces of a liquid crystal layer adjacent to two substrates have pretilt angles in a range of 0° to 5° as disclosed in U.S. Pat. No. 6,078,375. An IPS panel (liquid crystal cell) has an active matrix drive electrode comprising a pair of electrodes aligned in the same plane. In addition, the active matrix drive electrode provides IPS (In-Plain Switching), S-IPS (Super-In-Plain Switching) and FFS (Fringe Field Switching) modes to a liquid crystal layer formed between two glass substrates. According to the S-IPS mode, a two-domain liquid crystal alignment can be obtained by forming a zig-zag type electrode pattern, so an IPS color shift in a white state(Bright State) may be minimized.

The IPS-LCD is disclosed in U.S. Pat. No. 3,807,831. However, the IPS-LCD disclosed in U.S. Pat. No. 3,807,831 does not use a compensation film. Accordingly, the IPS-LCD represents a low contrast ratio at a predetermined inclination angle due to a relatively great amount of light leakage.

U.S. Pat. No. 5,189,538 discloses an LCD including two kinds of retardation films, such as a +A-plate and a positive biaxial retardation film, but it does not disclose information or technologies about the IPS-LCD.

U.S. Pat. No. 5,440,413 discloses a TN-LCD having two positive biaxial retardation films in order to improve the contrast characteristic and color characteristic of the TN-LCD at a predetermined inclination angle.

An IPS-LCD compensation film using one positive biaxial retardation film is disclosed in U.S. Pat. No. 6,285,430. Characteristics of the IPS-LCD are as follows:
One positive biaxial retardation film is aligned between a polarizer plate and a liquid crystal layer.
An in-plane retardation value of the biaxial retardation film is about 190 nm to 390 nm.
An in-plane retardation value of the biaxial retardation film increases in proportional to an absolute value of a retardation in a direction of thickness of a polarizer plate protection film.

A main object of using the biaxial retardation film is to improve a contrast characteristic of the IPS-LCD at an inclination angle in all azimuthal angles, especially 45°, 135°, 225° and 315°. Although the contrast characteristic of the IPS-LCD can be improved at the above azimuthal angles, the IPS-LCD in a black state represents a great amount of light leakage at other azimuthal angles. For this reason, a contrast ratio of the IPS-LCD is relatively reduced at other azimuthal angles. Therefore, the above IPS-LCD has a disadvantage in that the IPS-LCD represents a relatively low contrast ratio at specific azimuthal angles due to relatively great light leakage in the black state.

BRIEF DESCRIPTION OF THE DRAWINGS

FIGS. 7 to 10 are graphs representing simulation results for a contrast characteristic at inclination angles of about 0° to 80° in all azimuthal angles when a white light is used in an IPS-LCD structure including a viewing angle compensation film according to one embodiment of the present invention, in which FIG. 7 is a simulation result of a first IPS-LCD structure, FIG. 8 is a simulation result of a second IPS-LCD structure, FIG. 9 is a simulation result of a third IPS-LCD structure, and FIG. 10 is a simulation result of a third IPS-LCD structure.

DISCLOSURE OF THE INVENTION

Figure 1:
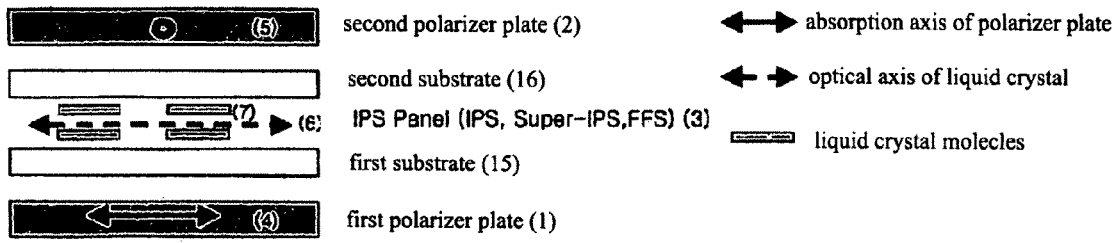
FIG. 1 is a view illustrating a basic structure of an IPS-LCD.

It is an object of the present invention to provide an IPS-LCD capable of obtaining a high contrast characteristic at all inclination angles in all azimuthal angles as well as at a front position.

Another object of the present invention is to provide an IPS-LCD representing low transmittance in a black state at all inclination angles in all azimuthal angles.

The present invention accomplishes the above object by using a positive biaxial retardation film while adjusting an optical axis direction and the retardation value of the positive biaxial retardation film.

In order to accomplish the above object, there is provided an in-plane switching liquid crystal display comprising: a first polarizer plate; a second polarizer plate; and a liquid crystal cell, which is horizontally aligned between two glass substrates and filled with liquid crystal of positive dielectric anisotropy ($\Delta \in > 0$) or negative dielectric anisotropy ($\Delta \in < 0$), an optical axis of the liquid crystal filled in the liquid crystal cell being aligned in-plane in parallel to the first and second polarizer plates, wherein an absorption axis of the first polarizer plate is perpendicular to an absorption axis of the second polarizer plate, the optical axis of the liquid crystal filled in the liquid crystal cell is parallel to the absorption axis of the first polarizer plate, a positive biaxial retardation film is aligned between the liquid crystal cell and the polarizer plate in order to compensate for a viewing angle, and an optical axis direction and a retardation value of the positive biaxial retardation film are adjusted according to an alignment order of positive biaxial retardation films.

In order to compensate for the viewing angle of the in-plane switching liquid crystal display (IPS-LCD) in a black state, the present invention is characterized by using at least one positive biaxial retardation film in which an optical axis direction and a retardation value of the positive biaxial retardation film are adjusted according to upper and lower polarizer plates and an alignment order of the positive biaxial retardation films.

A contrast ratio is an index representing a degree of definition for an image, and a high contrast ratio allows a high definition image. The contrast characteristic of the IPS-LCD is most deteriorated at an inclination angle of 70°. Thus, if the IPS-LCD represents an improved contrast characteristic at the inclination angle of 70°, it means that the contrast characteristic of the IPS-LCD is improved at all viewing angles. Accordingly, comparison of improvement for viewing angle characteristics of IPS-LCDs is preferably carried out with the inclination angle of 70°. When the IPS-LCD uses the only polarizer plates, a minimum contrast ratio at the inclination angle of 70° is equal to or less than 10:1. However, the IPS-LCD of the present invention uses the positive biaxial retardation film while adjusting the optical axis and the retardation value thereof, so the IPS-LCD of the present invention may represent a minimum contrast ratio above 20:1. Preferably, the IPS-LCD of the present invention represents the minimum contrast ratio above 20:1 at the inclination angle of 70°.

Reference will now be made in detail to the present invention.

FIG. 1 is a view illustrating a basic structure of an IPS-LCD.

Figure 2:
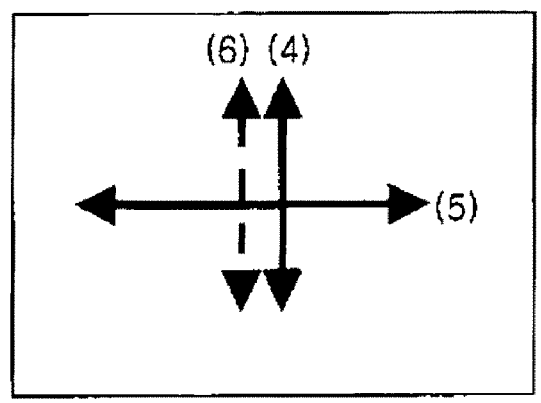
FIG. 2 is a view illustrating an alignment of an absorption axis of a polarizer plate and an optical axis of liquid crystal in IPS-LCD panel of FIG. 1.

The IPS-LCD includes a first polarizer plate 1, a second polarizer plate 2 and a liquid crystal cell 3. An absorption axis 4 of the first polarizer plate 1 is aligned in perpendicular to the an absorption axis 5 of the second polarizer plate 2 and the absorption axis 4 of the first polarizer plate 1 is parallel to an optical axis 6 of the liquid crystal cell 3. In FIG. 2, two absorption axes 4 and 5 of two polarizer plates and one optical axis 6 of one liquid crystal cell are shown.

The liquid crystal display using a compensation film according to the present invention includes the first polarizer plate 1, the liquid crystal cell 3, which is horizontally aligned between two glass substrates and filled with liquid crystal of positive dielectric anisotropy ($\Delta\varepsilon > 0$) or negative dielectric anisotropy ($\Delta\varepsilon < 0$), and the second polarizer plate 2. The optical axis 6 of the liquid crystal filled in the liquid crystal cell 3 is aligned in-plane in parallel to the polarizer plates. The absorption axis 4 of the first polarizer plate 1 is aligned in perpendicular to the absorption axis 5 of the second polarizer plate 2 and the absorption axis 4 of the first polarizer plate 1 is parallel to the optical axis 6 of the liquid crystal filled in the liquid crystal cell 3. In addition, one of the first and second substrates includes an active matrix drive electrode having a pair of electrodes, which is formed on a surface of the substrate adjacent to a liquid crystal layer.

A retardation value of the liquid crystal layer is defined as $R_{LC} = (n_{x,LC} - n_{y,LC}) \times d$, wherein d is a thickness of the liquid crystal layer. Preferably, the liquid crystal layer of the IPS panel according to the present invention has a retardation value in a range of 200 nm to 400 nm at a wavelength of 550 nm.

In order to make a white state when voltage is applied to the IPS-LCD panel, the light linearly polarized at 90° after passing through the first polarizer plate must be linearly polarized into 0° after it has passed through the liquid crystal layer. Further, in order to achieve the state of light polarized as described above, the retardation value of the liquid crystal layer of the IPS-LCD must be a half wavelength of 589 nm (a monochromatic light representing a highest brightness which a person can feel). Therefore, in order to allow the light to produce a white color, the retardation value of the liquid crystal layer of the IPS-LCD can be adjusted to be somewhat shorter or longer than the half wavelength of 589 nm. Therefore, the retardation value is preferably in the range around 295 nm corresponding to the half wavelength of 589 nm.

The LCD of the present invention may align the liquid crystal in multi-directions, or the liquid crystal may be divided into multi-regions by voltage applied thereto.

The LCDs can be classified into IPS (In-Plain Switching) LCDs, Super-IPS (Super-In-Plain Switching) LCDs and FFS (Fringe Field Switching) LCDs according to modes of the active matrix drive electrode including a pair of electrodes. In the present invention, the IPS-LCD may include the Super-IPS LCD, the FFS LCD, and a reverse TN IPS LCD.

Figure 3:
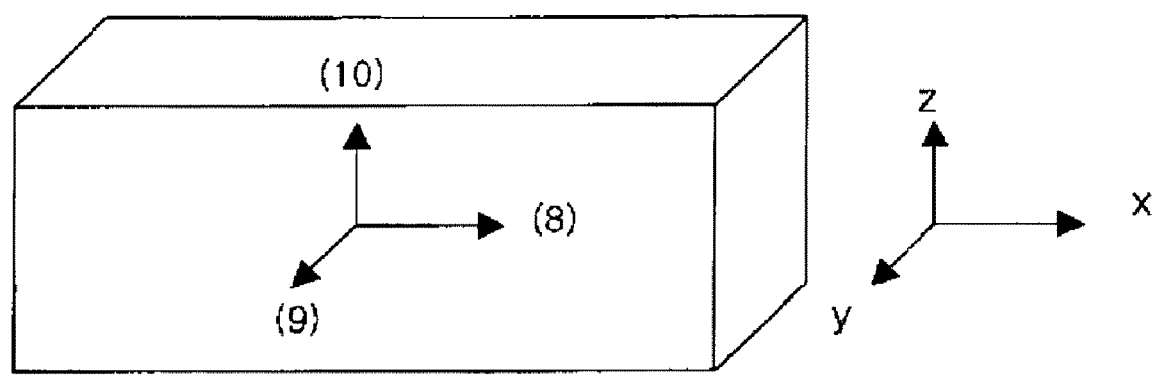
FIG. 3 is a view illustrating a refractive index of a retardation film.

FIG. 3 illustrates a refractive index of a retardation film used for compensating for a viewing angle of the IPS-LCD. Referring to FIG. 3, a refractive index in an x-axis direction is $n_x(8)$, a refractive index in a y-axis direction is $n_y(9)$, and a refractive index in a z-axis direction is $n_z(10)$. The characteristic of the retardation film depends on the refractive index.

A biaxial retardation film represents mutually different refractive indexes in x-axis, y-axis and z-axis directions. The biaxial retardation film is defined as follows:

$$n_x \neq n_y \neq n_z \quad \text{Equation 1}$$

A negative biaxial retardation film is defined as follows:

$$n_x \neq n_y > n_z \quad \text{Equation 2}$$

A positive biaxial retardation film is defined as follows:

$$n_x \neq n_y < n_z \quad \text{Equation 3}$$

The positive biaxial retardation film satisfying Equation 3 represents mutually different refractive indexes in x-axis, y-axis and z-axis directions, so it has an in-plane retardation value and a thickness retardation value. The in-plane retardation value can be defined as follows by using in-plane refractive indexes of $n_x(8)$ and $n_y(9)$.

$$R_{in} = d \times (n_x - n_y), \quad \text{Equation 4}$$

wherein d is a thickness of a film.

The thickness retardation value can be defined as follows by using refractive indexes of $n_y(9)$ and $n_z(10)$.

$$R_{th} = d \times (n_z - n_y), \quad \text{Equation 5}$$

wherein d is a thickness of a film.

The positive biaxial retardation film signifies a film having the positive in-plane retardation value and the positive thickness retardation value.

The wavelength dispersion characteristic of the positive biaxial retardation film includes normal wavelength dispersion, flat wavelength dispersion, and reverse wavelength dispersion. The unlimited example of the positive biaxial retardation film includes an UV curable liquid crystal film using a nematic liquid crystal and a biaxially oriented PC (polycarbonate).

According to the present invention, the direction of the optical axis of the retardation film is determined according to an alignment order of the retardation film.

According to a first embodiment of the present invention, there is provided an in-plane switching liquid crystal display including a positive biaxial retardation film 11 aligned between an IPS panel 3 and a second polarizer plate 2, in which an optical axis 12 of the positive biaxial retardation film 11 is perpendicular to an absorption axis 5 of the second polarizer plate 2, with an in-plane retardation value of the positive biaxial retardation film 11 equal to or less than 190 nm at a wavelength of 550 nm.

The optical axis of the retardation film relates to light leakage generated from two polarizer plates with the absorption axes thereof aligned perpendicularly to each other. That is, in order to minimize the light leakage of the polarizer plates, the in-plane optical axis of the positive biaxial retardation film must be aligned perpendicularly to the absorption axis of the polarizer plate adjacent to the positive biaxial retardation film.

When the absorption axes of the polarizer plates are aligned in an angular direction of 0° and 90° respectively, if an observer checks the black state while inclining the polarizer plates in a direction of an azimuthal angle of 45°, it can be found that the light leakage increases as the inclination angle increases. This is because the angle between absorption axes of two polarizer plates greatly deviates from a perpendicular state as the inclination angle increases. That is, in order to minimize the light leakage, the polarized light must be rotated by an extent of angle as deviated from a perpendicular state. The light radiated from a backlight unit is linearly polarized after passing through the first polarizer plate, and a rotational angle of the linearly polarized light must be increased according to the inclination angle. In order to rotate the linearly polarized light, the in-plane optical axis of the positive biaxial retardation film must be aligned in perpendicular to the absorption axis of the adjacent polarizer plate.

Meanwhile, in order to allow the linearly polarized light to rotate in match with the absorption axis of the second polarizer plate corresponding to an increase of the inclination angle, the in-plane retardation value of the positive biaxial retardation film is preferably set equal to or less than 190 nm. At this time, the in-plane retardation value of the positive biaxial retardation film may vary according to the thickness retardation value of the positive biaxial retardation film. In order to properly compensate for the viewing angle, it is preferred to reduce the in-plane retardation value as the total thickness retardation value of the retardation film increases.

Figure 4A:
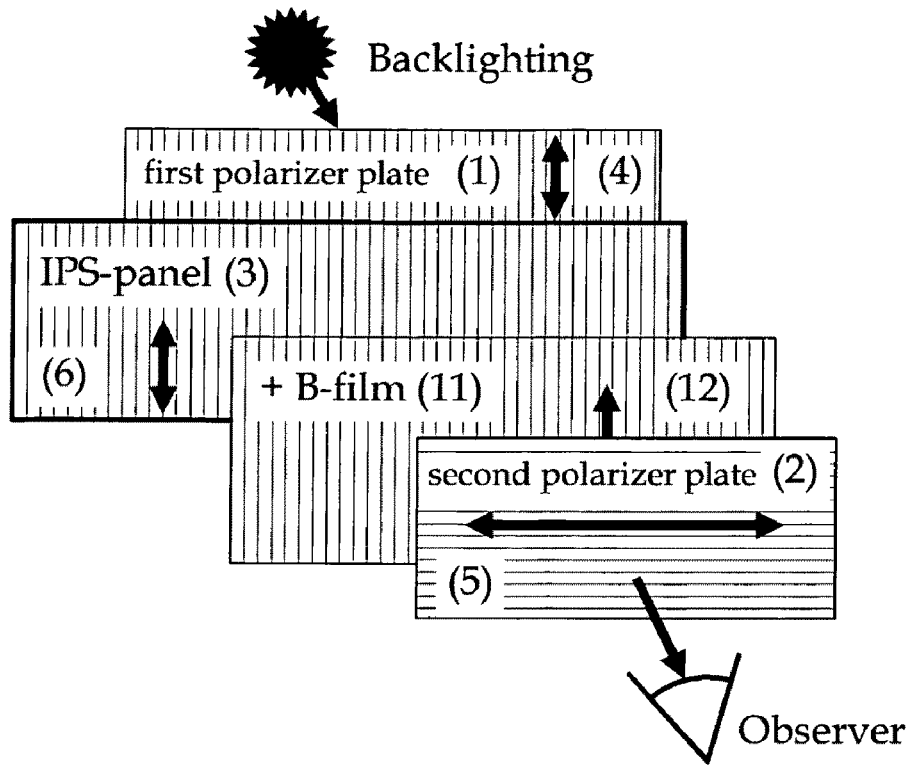
FIGS. 4a and 4b are views illustrating a structure of a first IPS-LCD including a viewing angle compensation film according to one embodiment of the present invention.
Figure 4B:
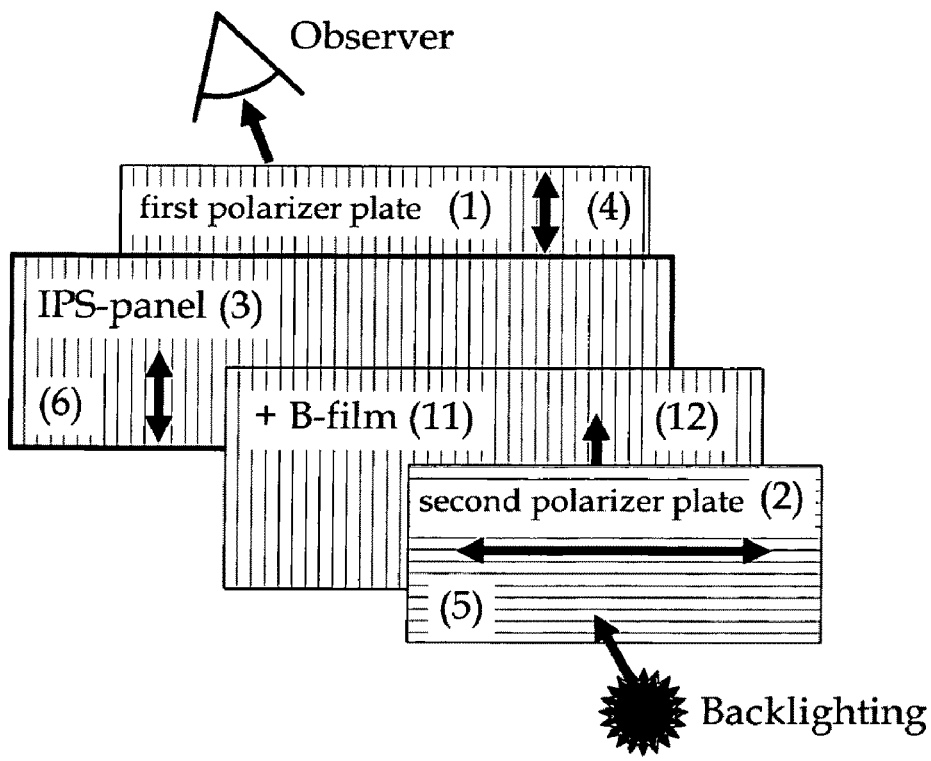

The first embodiment of the present invention is illustrated in FIGS. 4a and 4b, and the structures of the IPS-LCDs shown in FIGS. 4a and 4b are substantially identical to each other, except for positions of a backlight unit and an observer.

Table 1 is a simulation result for a viewing angle characteristic at an inclination angle of 70° according to design values (in-plane retardation value and thickness retardation value) of a polarizer plate protective film and the positive biaxial retardation film under the first IPS-LCD structure shown in FIG. 4a.

TABLE 1

| Internal protective film of 1st polarizer plate | IPS-Panel | Positive biaxial retardation film | | | Internal protective film of 2nd polarizer plate | Minimum contrast ratio at inclination angle of 70° |
|---|---|---|---|---|---|---|
| | | $R_{in}$(nm) | $R_{th}$(nm) | Nz | plate | |
| COP | 290 nm | 180 | 144 | 0.2 | 80 um TAC | 166 |
| | | 160 | 173 | −0.08 | 120 um TAC | 83 |

TABLE 1-continued

| Internal protective film of 1st polarizer plate | IPS-Panel | Positive biaxial retardation film | | | Internal protective film of 2nd polarizer plate | Minimum contrast ratio at inclination angle of 70° |
|---|---|---|---|---|---|---|
| | | $R_{in}$(nm) | $R_{th}$(nm) | Nz | plate | |
| 40 um TAC | | 160 | 88 | 0.45 | 40 um TAC | 83 |
| | | 124 | 102 | 0.18 | 80 um TAC | 79 |
| | | 118 | 139 | −0.17 | 120 um TAC | 65 |
| 80 um TAC | | 160 | 49 | 0.72 | COP | 33 |
| | | 155 | 78 | 0.5 | 40 um TAC | 30 |
| | | 110 | 77 | 0.3 | 80 um TAC | 30 |

The simulation is carried out with conditions representing the superior viewing angle characteristic at all inclination angles in all azimuthal angles by taking the retardation values of internal protective films of the first and second polarizer plates 1 and 2, the in-plane retardation value and the thickness retardation value of the positive biaxial retardation film 11, and an Nz representing biaxiality into consideration.

Herein, the Nz is an index representing biaxiality of the positive biaxial retardation film, which can be defined as follows by using the refractive indexes of the film in three axis directions.

$$N_z = \frac{(n_x - n_z)}{(n_x - n_y)} \qquad \text{Equation 6}$$

Table 1 shows the improvement in the viewing angle characteristic according to the design values of the polarizer plate protective film and the positive biaxial retardation film. Referring to Table 1, since the IPS-LCD which does not use the viewing angle compensation film has a minimum CR (contrast ratio) of about 7:1, if the IPS-LCD represents the CR above 30:1 at an inclination angle of 70°, it means that the CR value above 30:1 can be obtained in all viewing angles, resulting in a much improvement of the viewing angle characteristic.

In addition, Table 2 shows a simulation result when practical design values of a retardation film are applied to the IPS-LCD structure shown in FIG. 4b.

TABLE 2

| Internal protective film of 1st polarizer plate | IPS-Panel | Positive biaxial retardation film | | | Internal protective film of 2nd polarizer plate | Minimum contrast ratio at inclination angle of 70° |
|---|---|---|---|---|---|---|
| | | $R_{in}$(nm) | $R_{th}$(nm) | Nz | plate | |
| 40 um TAC | | 250 | 170 | 76 | 0.55 | 40 um TAC | 83 |
| | | 290 | 160 | 88 | 0.45 | TAC | 83 |
| | | 330 | 155 | 102 | 0.34 | | 83 |

Table 2 shows the improvement in the viewing angle characteristic according to the design values of the polarizer plate protective film and the positive biaxial retardation film. If 40 um TAC (triacetate cellulose) is used as a polarizer plate protective film, the polarizer plate protective film has a negative $R_{th}$ lower than an $R_{th}$ of the polarizer plate protective film of 80 um TAC, so the design value of the positive biaxial retardation film is changed. Accordingly, it is possible to obtain a superior viewing angle characteristic by varying the design values. In detail, it is possible to obtain the CR more than 80:1 at an inclination angle of 70° by adjusting the design values of the polarizer plate protective film and the positive biaxial retardation film.

According to a second embodiment of the present invention, there is provided an in-plane switching liquid crystal display including a first positive biaxial retardation film 11 aligned between an IPS panel 3 and a first polarizer plate 1, and a second positive biaxial retardation film 13 aligned between the IPS panel 3 and a second polarizer plate 2, in which an optical axis 12 of the first positive biaxial retardation film 11 is parallel to an absorption axis 4 of the first polarizer plate 1 and an optical axis 14 of the second positive biaxial retardation film 13 is perpendicular to an absorption axis 5 of the second polarizer plate 2, with the first positive biaxial retardation film 11 having an in-plane retardation value equal to or less than 190 nm at a wavelength of 550 nm and the second positive biaxial retardation film 13 having an in-plane retardation value in a range of 150 to 350 nm at a wavelength of 550 nm.

The viewing angle characteristic of the IPS-LCD may be lowered due to a geometrical problem of the polarizer plate depending on the viewing angle and a dependency of the retardation value of the IPS-LCD panel to the viewing angle. The black state of the LCD is obtained by using two polarizer plates, in which a light generated from the backlight unit and linearly polarized by the first polarizer plate is absorbed by means of the absorption axis of the second polarizer plate. However, unlike a vertical incident light, a slantingly incident light creates a rotated linearly polarized light which has been rotated after passing through the polarizer plate, and experiences the absorption axis of the second polarizer plate rotated. Therefore, the linearly polarized light introduced through the first polarizer plate is not perpendicular to the absorption axis of the second polarizer plate, so a light component, which is parallel to a transmission axis, is created. As the inclination angle becomes enlarged, the linearly polarized light greatly deviates from the perpendicular state with respect to the transmission axis, so light components in parallel to the transmission axis may increase. For this reason, the light leakage may occur in the black state.

The light leakage under the black state of the LCD is a main factor causing deterioration of the viewing angle characteristic of the LCD. The light leakage increases according to an increase of the inclination angle and the increase of the light leakage lowers the CR and increases a color shift. Thus, it is possible to improve the viewing angle characteristic by minimizing the light leakage under the black state depending on the inclination angle. In order to improve the viewing angle characteristic, the light which has been linearly polarized after passing through the first polarizer plate must match with the absorption axis of the second polarizer plate. To this end, the present invention utilizes the positive biaxial retardation film. In order to allow the light, which has been linearly polarized, to match with the absorption axis of the second polarizer plate according to the inclination angle, the in-plane retardation value and the thickness retardation value are necessary.

The absorption axis of the first polarizer plate must match with the optical axis of the first positive biaxial retardation film, so as that a predetermined elliptically polarized light can be created through the first positive biaxial retardation film. Then, the elliptically polarized light turns into a linearly polarized light matching with the absorption axis of the polarizer plate through the second positive biaxial retardation film. To this end, the optical axis of the second positive biaxial retardation film must be aligned perpendicularly to the absorption axis of the second positive biaxial retardation film. If the first positive biaxial retardation film having an in-plane retardation value equal to or less than 190 nm is employed, the first positive biaxial retardation film converts the light, which has been linearly polarized through the first polarizer plate, into an elliptically polarized light, which is required for generating the linearly polarized light which matches with the absorption axis of the second polarizer plate after the light has passed through the second positive biaxial retardation film.

The second positive biaxial retardation film converts the elliptically polarized light formed through the first positive biaxial retardation film into the linearly polarized light. In addition, if the second positive biaxial retardation film having the retardation value in a range of about 150 nm to 350 nm is used according to the polarizing state of the light created by the first positive biaxial retardation film, it is possible to obtain the linearly polarized light which matches with the absorption axis of the second polarizer plate.

Figure 5A:
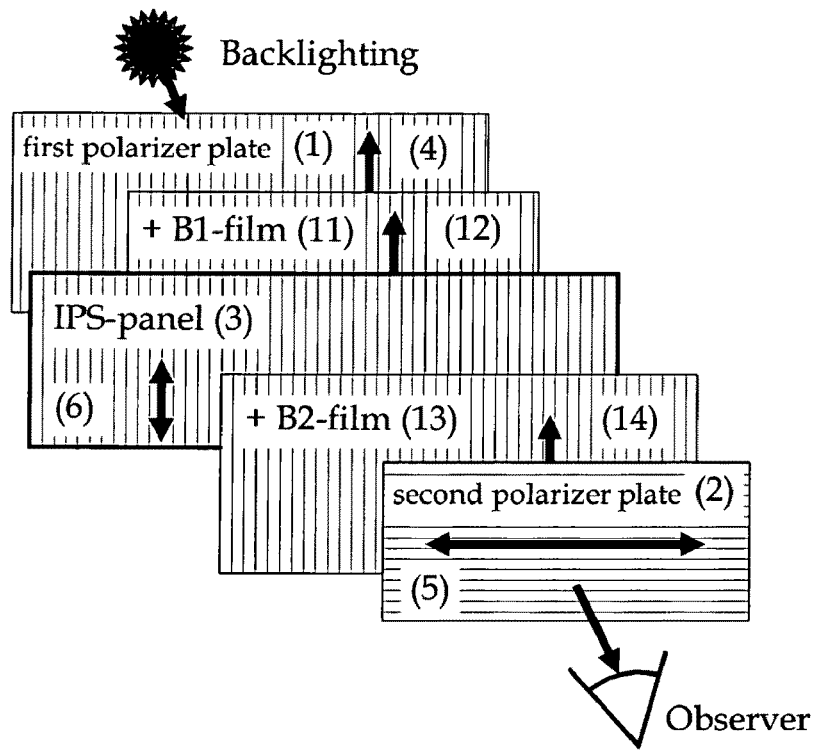
FIGS. 5a and 5b are views illustrating a structure of a second IPS-LCD including a viewing angle compensation film according to one embodiment of the present invention.
Figure 5B:
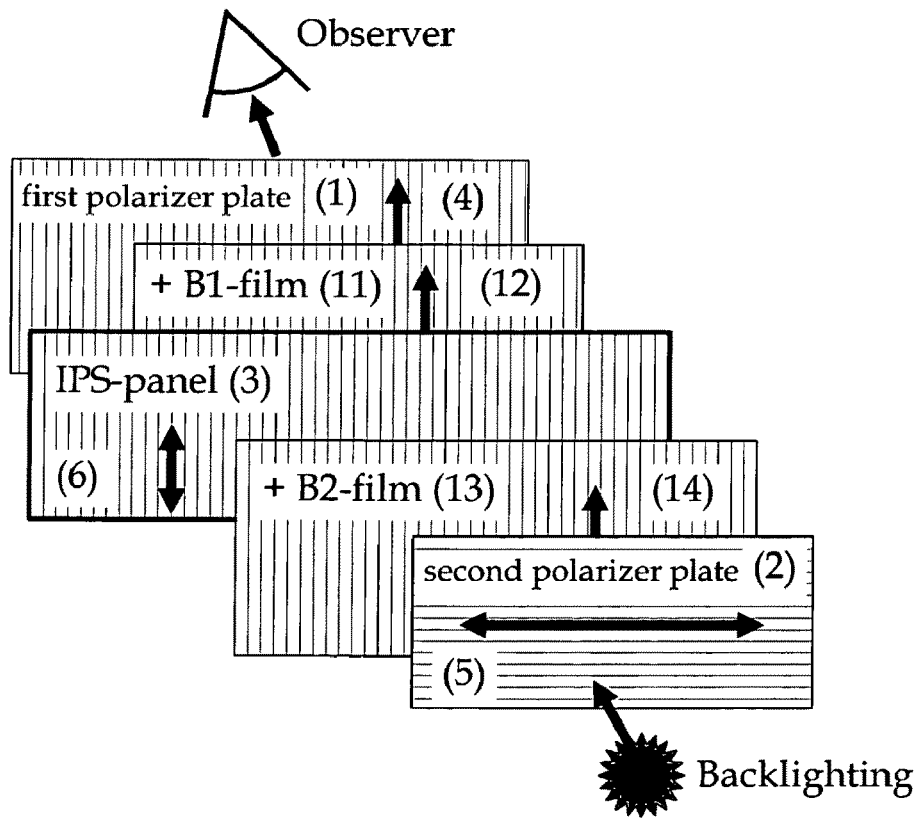

The second embodiment of the present invention is illustrated in FIGS. 5a and 5b, and the structures of the IPS-LCDs shown in FIGS. 5a and 5b are substantially identical to each other, except for positions of a backlight unit and an observer.

Table 3 shows a simulation result when practical design values of a retardation film are applied to the second IPS-LCD structure shown in FIG. 5a or 5b.

TABLE 3

| Internal protective film of 1st polarizer plate | Positive biaxial retardation film | | | IPS-Panel | Positive biaxial retardation film | | | Internal protective film of 2nd polarizer plate | Minimum contrast ratio at angle of 70° |
|---|---|---|---|---|---|---|---|---|---|
| | $R_{in}$(nm) | $R_{th}$(nm) | Nz | | $R_{in}$(nm) | $R_{th}$(nm) | Nz | | |
| COP | 25 | 12.5 | 0.5 | 290 nm | 285 | 142 | 0.5 | COP | 238 |
| | 35 | 17 | 0.5 | | 230 | 115 | 0.5 | 40 um TAC | 160 |
| | 60 | 30 | 0.5 | | 200 | 100 | 0.5 | 80 um TAC | 55 |
| 40 um TAC | 160 | 88 | 0.45 | | 302 | 151 | 0.5 | COP | 214 |
| | 124 | 102 | 0.18 | | 250 | 125 | 0.5 | 40 um TAC | 136 |
| | 118 | 139 | −0.17 | | 220 | 110 | 0.5 | 80 um TAC | 50 |
| 80 um TAC | 160 | 49 | 0.72 | | 350 | 175 | 0.5 | COP | 100 |
| | 155 | 78 | 0.5 | | 300 | 150 | 0.5 | 40 um TAC | 68 |

The above simulation is carried out with conditions representing the superior viewing angle characteristic at all inclination angles in all azimuthal angles by taking the retardation values of internal protective films of the first and second polarizer plates 1 and 2, the in-plane retardation value and the thickness retardation value of the first and second positive biaxial retardation films 11 and 13, and an Nz representing biaxiality into consideration.

Table 3 shows the minimum CR values at the inclination angle of 70° according to the design values (in-plane retardation value, thickness retardation value and internal protective film) of the first and second positive biaxial retardation films in the IPS-LCD. The most superior viewing angle characteristic is represented when a non oriented COP (cyclo olefin polymer) film having a thickness retardation value of 0 is used for the polarizer plate internal protective film.

According to a third embodiment of the present invention, there is provided an in-plane switching liquid crystal display including a first positive biaxial retardation film 11 aligned between an IPS panel 3 and a first polarizer plate 1, and a second positive biaxial retardation film 13 aligned between the IPS panel 3 and a second polarizer plate 2, in which an optical axis 12 of the first positive biaxial retardation film 11 is parallel to an absorption axis 4 of the first polarizer plate 1 and an optical axis 14 of the second positive biaxial retardation film 13 is parallel to an absorption axis 5 of the second polarizer plate 2, with the first positive biaxial retardation film 11 having an in-plane retardation value equal to or less than 150 nm at a wavelength of 550 nm and the second positive biaxial retardation film 13 having an in-plane retardation value in a range of 200 to 350 nm at a wavelength of 550 nm.

The optical axis of first positive biaxial retardation film must be aligned in parallel to the absorption axis of the first polarizer plate in order to convert the light into an elliptically polarized light, which is required for generating the linearly polarized light after the light passes through the second positive biaxial retardation film.

The elliptically polarized light created by the first positive biaxial retardation film can be converted into the linearly polarized light through two methods. A first method is to align the optical axis of the second positive biaxial retardation film in perpendicular to the absorption axis of the second polarizer plate and a second method is to align the optical axis of the second positive biaxial retardation film in parallel to the absorption axis of the second polarizer plate. In this case, the design value of the first method is different from that of the second method.

The retardation value of the first positive biaxial retardation film may vary depending on the design value of the second positive biaxial retardation film and the first positive biaxial retardation film having the in-plane retardation value equal to or less than 150 nm can create the elliptically polarized light required for generating the linearly polarized light, which is parallel to the absorption axis of the second polarizer plate, after the light has passed through the second positive biaxial retardation film.

In addition, the retardation value of the second positive biaxial retardation film is determined according to the retardation value of the first positive biaxial retardation film and the second positive biaxial retardation film having the retardation value in a range of about 200 nm to 350 nm can create the linearly polarized light, which matches with the absorption axis of the second polarizer plate.

Figures 6A, 6B:
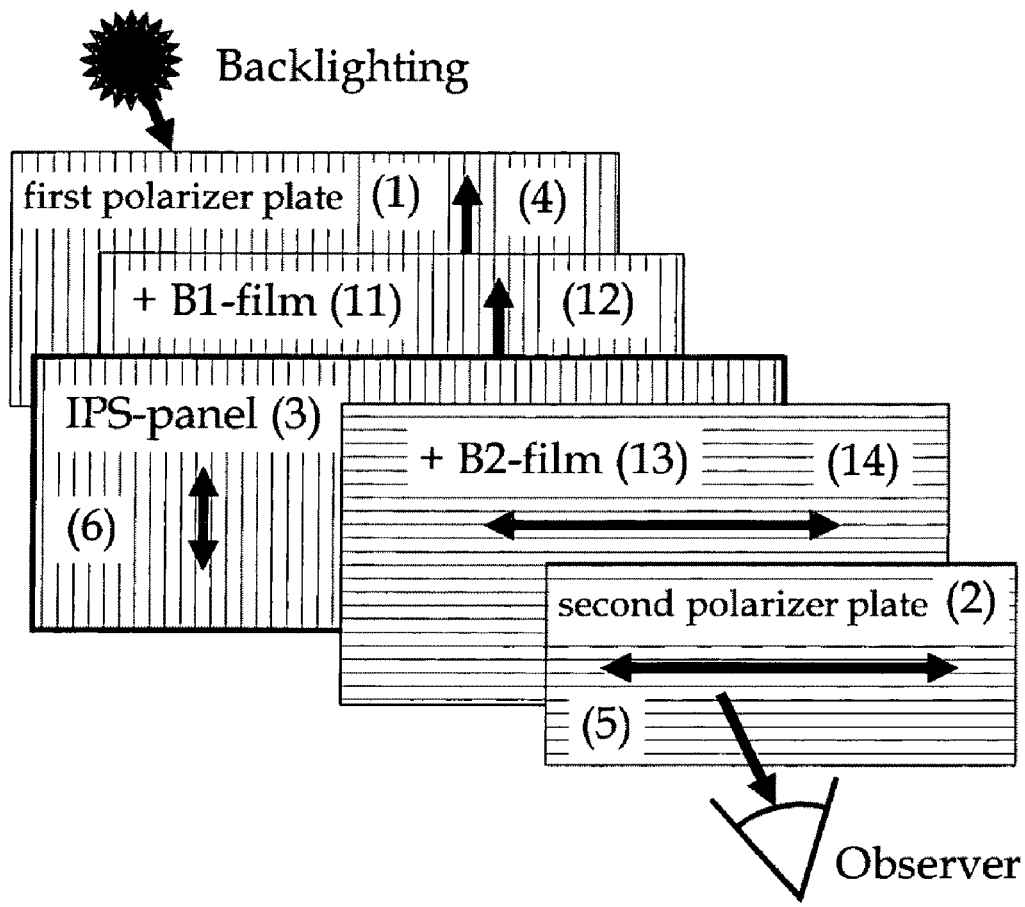
FIGS. 6a and 6b are views illustrating a structure of a third IPS-LCD including a viewing angle compensation film according to one embodiment of the present invention.

The third embodiment of the present invention is illustrated in FIGS. 6a and 6b, and the structures of the IPS-LCDs shown in FIGS. 6a and 6b are substantially identical to each other, except for positions of a backlight unit and an observer.

Table 4 shows a simulation result when practical design values of a retardation film are applied to the third IPS-LCD structure shown in FIG. 6a or 6b.

TABLE 4

| Internal protective film of $1^{st}$ polarizer plate | Positive biaxial retardation film | | | IPS-Panel | Positive biaxial retardation film | | | Internal protective film of $2^{nd}$ polarizer plate | Minimum contrast ratio at angle of 70° |
|---|---|---|---|---|---|---|---|---|---|
| | $R_{in}$(nm) | $R_{th}$(nm) | Nz | | $R_{in}$(nm) | $R_{th}$(nm) | Nz | | |
| COP | 35 | 17 | 0.5 | 290 nm | 250 | 125 | 0.5 | COP | 278 |
| | 44 | 22 | 0.5 | | 310 | 155 | 0.5 | 40 um TAC | 234 |
| | 75 | 37 | 0.5 | | 334 | 167 | 0.5 | 80 um TAC | 100 |
| 40 um TAC | 100 | 50 | 0.5 | | 241 | 120 | 0.5 | COP | 259 |
| | 120 | 60 | 0.5 | | 282 | 141 | 0.5 | 40 um TAC | 235 |
| | 145 | 72 | 0.5 | | 314 | 157 | 0.5 | 80 um TAC | 94 |
| 80 um TAC | 123 | 62 | 0.5 | | 180 | 90 | 0.5 | COP | 136 |
| | 145 | 72 | 0.5 | | 239 | 120 | 0.5 | 40 um TAC | 100 |

The above simulation is carried out with conditions representing the superior viewing angle characteristic at all inclination angles in all azimuthal angles by taking the retardation values of internal protective films of the first and second polarizer plates 1 and 2, the in-plane retardation value and the thickness retardation value of the positive biaxial retardation film, and an Nz representing biaxiality into consideration. In order to simplify the simulation, "Nz=0.5" is adopted in Table 4. However, it is also possible to use other values of the Nz.

Table 4 shows the minimum CR values at the inclination angle of 70° according to the design values when the absorption axis of the first polarizer plate is parallel to the optical axis of the first positive biaxial retardation film and the absorption axis of the second polarizer plate is parallel to the optical axis of the second positive biaxial retardation film. The minimum CR value at the inclination angle of 70° may vary according to the design values of the first and second positive biaxial retardation films and the polarizer plate internal protective film. The most superior viewing angle characteristic is represented when a non oriented COP (cyclo olefin polymer) film, which has no in-plane retardation value, is used for the polarizer plate internal protective film.

The polarizer plate may use internal and external protective films having unique negative thickness retardation values or internal and external protective films, which do not have the thickness retardation values.

The unlimited example of internal protective film includes non oriented COP (cyclo olefin polymer), 40 um TAC(triacetate cellulose), 80 um TAC(triacetate cellulose) or PNB (polynobonene).

The thickness retardation value of the polarizer plate internal protective film is a very important factor when designing the retardation film such that the IPS-LCD represents low transmittance under a dark state at all inclination in all azimuthal angles.

The internal protective film of the first polarizer plate 1 preferably has a thickness retardation value of 0 or a negative thickness retardation value. This is because the positive biaxial retardation film adjacent to the first polarizer plate 1 may compensate for the retardation value generated from the inner protective film of the first polarizer plate 1.

In addition, the positive biaxial retardation film can be used as an inner protective film of at least one polarizer plate.

Preferably, the positive biaxial retardation films 11 and 13 are made from polymer materials or UV curable liquid crystal films.

The Nz $$\left(N_z = \frac{(n_x - n_z)}{(n_x - n_y)}\right)$$

representing the biaxiality of the biaxial retardation film in the present LCD may have various values.

BEST MODE FOR CARRYING OUT THE INVENTION

Hereinafter, preferred embodiments of the present invention will be described. However, it is noted that the preferred embodiments described below are used for illustrative purpose and the present invention is not limited thereto.

Embodiment 1

The IPS-LCD shown in FIG. 4*a* includes an IPS liquid crystal cell filled with liquid crystal having a cell gap of 2.9 μm, a pretilt angle of 3°, dielectric anisotropy of Δ∈=+7, and a birefringence of Δn=0.1. An UV curable liquid crystal film having an in-plane retardation value $R_{in}$=180 nm and a thickness retardation value $R_{th}$=144 nm at a wavelength of 550 nm is used for a positive biaxial retardation film 11. A COP internal protective film having a retardation value of almost 0 is used as an internal protective film of a first polarizer plate 1 and 80 μm TAC having a thickness retardation value of $R_{th}$=−64 nm at a wavelength of 550 nm is used as an internal protective film of a second polarizer plate 2. When a white light is used, the simulation result for the contrast characteristic of a first IPS-LCD structure including a viewing angle compensation film at an inclination angle of about 0° to 80° in all azimuthal angles is illustrated in FIG. 7 and Table 1.

Figure 7:
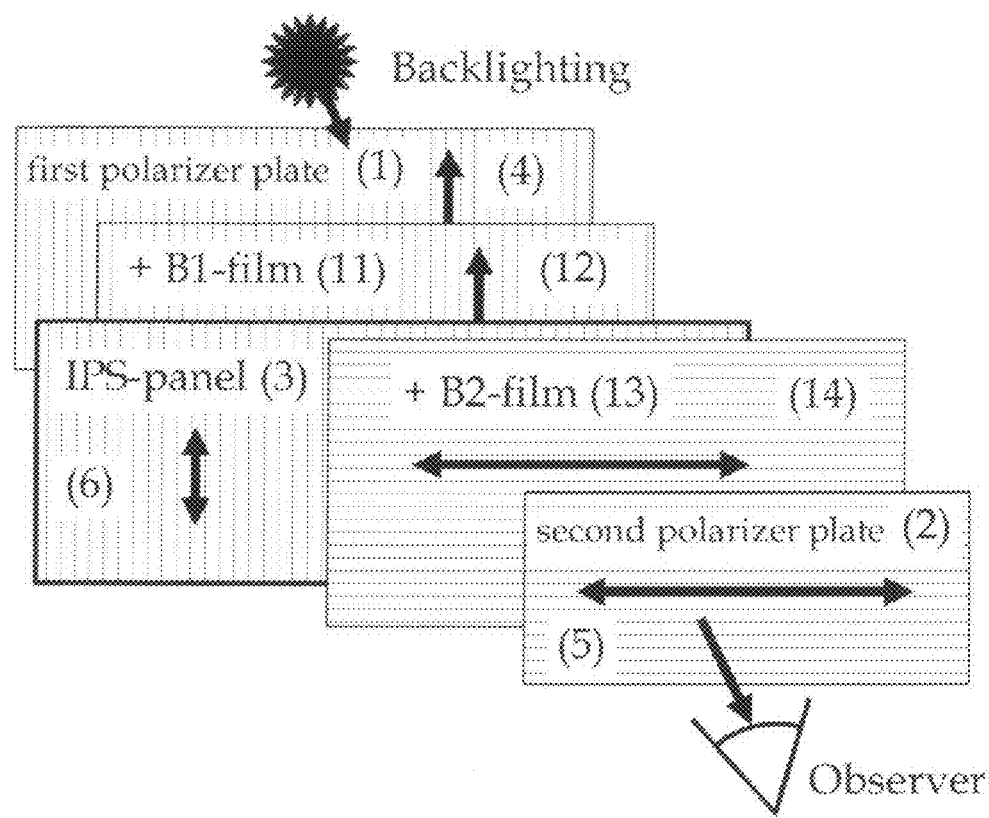

Referring to FIG. 7, a center of a circle corresponds to an inclination angle of 0, and the inclination angle increases as a radius of the circle becomes enlarged. Numerals 20, 40, 60 and 80 marked along the radius of the circle in FIG. 7 represent the inclination angles.

In addition, numerals 0 to 360 marked along a circumference of the circle represent the azimuthal angles. FIG. 7 shows the contrast characteristic in all viewing directions (inclination angles of 0° to 80° and azimuthal angles of 0° to 360°) when an upper polarizer plate is aligned in a direction of an azimuthal angle of 0°, and a lower polarizer plate is aligned in a direction of an azimuthal angle of 90°. An IPS-LCD, which exclusively uses two polarizer plates, represents a contrast ratio equal to or less than 10:1 at an inclination angle of 70°. However, the IPS-LCD of the present invention represents a contrast ratio above 166:1 at an inclination angle of 70° as shown in FIG. 7 and Table 1.

Embodiment 2

Figure 8:
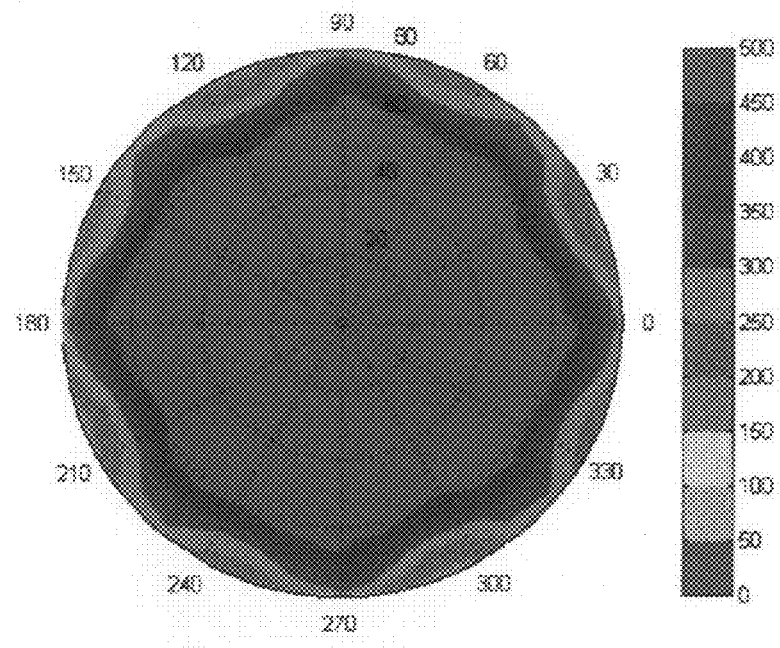

The IPS-LCD shown in FIG. Sb includes an IPS liquid crystal cell filled with liquid crystal having a cell gap of 2.9 μm, a pretilt angle of 3°, dielectric anisotropy of Δ∈=+7, and a birefringence of Δn=0.1. An UV curable liquid crystal film having an in-plane retardation value $R_{in}$=20 nm and a thickness retardation value $R_{th}$=10 nm at a wavelength of 550 nm is used for a first positive biaxial retardation film 11. In addition, an UV curable liquid crystal film having an in-plane retardation value $R_{in}$=288 nm and a thickness retardation value $R_{th}$=144 nm at a wavelength of 550 nm is used for a second positive biaxial retardation film 13. Internal protective films of polarizer plates 1 and 2 are made from COP. When a white light is used, the simulation result for the contrast characteristic of a second IPS-LCD structure including a viewing angle compensation film at an inclination angle of about 0° to 80° in all azimuthal angles is illustrated in FIG. 8.

Embodiment 3

The IPS-LCD shown in FIG. 6*a* includes an IPS liquid crystal cell filled with liquid crystal having a cell gap of 2.9 μm, a pretilt angle of 3°, dielectric anisotropy of Δ∈=+7, and a birefringence of Δn=0.1. An UV curable liquid crystal film having an in-plane retardation value $R_{in}$=87 nm and a thickness retardation value $R_{th}$=17.5 nm at a wavelength of 550 nm is used for a first positive biaxial retardation film 11. In addition, an UV curable liquid crystal film having an in-plane retardation value $R_{in}$=241 nm and a thickness retardation value $R_{th}$=120 nm at a wavelength of 550 nm is used for a second positive biaxial retardation film 13. An internal protective film of a first polarizer plate 1 is made from 40 μm TAC having a thickness retardation value $R_{th}$=−32 nm, and the second positive biaxial retardation film 13 is used as an internal protective film of a second polarizer plate 2.

Figure 9:
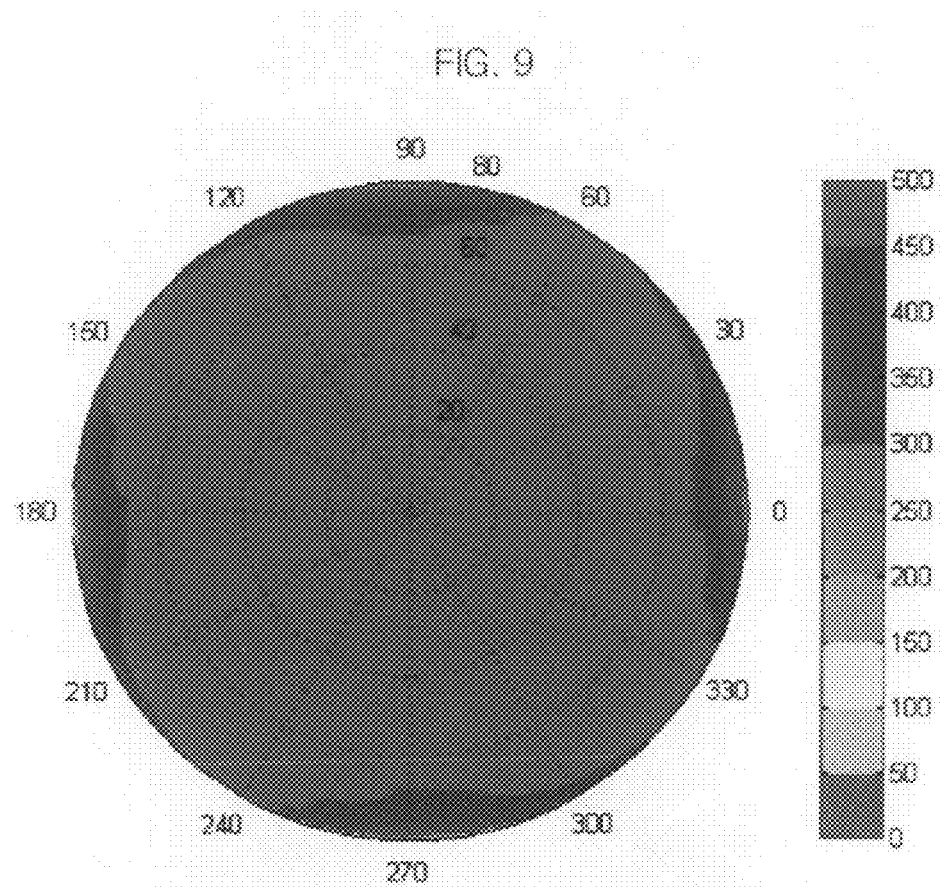

When a white light is used, the simulation result for the contrast characteristic of a third IPS-LCD structure including a viewing angle compensation film at an inclination angle of about 0° to 80° in all azimuthal angles is illustrated in FIG. 9.

Embodiment 4

The IPS-LCD shown in FIG. 6*b* includes an IPS liquid crystal cell filled with liquid crystal having a cell gap of 2.9 μm, a pretilt angle of 3°, dielectric anisotropy of Δ∈=+7, and a birefringence of Δn=0.1. An UV curable liquid crystal film having an in-plane retardation value $R_{in}$=35 nm and a thickness retardation value $R_{th}$=17.5 nm at a wavelength of 550 nm is used for a first positive biaxial retardation film 11. In addition, an UV curable liquid crystal film having an in-plane retardation value $R_{in}$=240 nm and a thickness retardation value $R_{th}$=120 nm at a wavelength of 550 nm is used for a second positive biaxial retardation film 13. Internal protective films of first and second polarizer plates 1 and 2 are made from COP.

Figure 10:
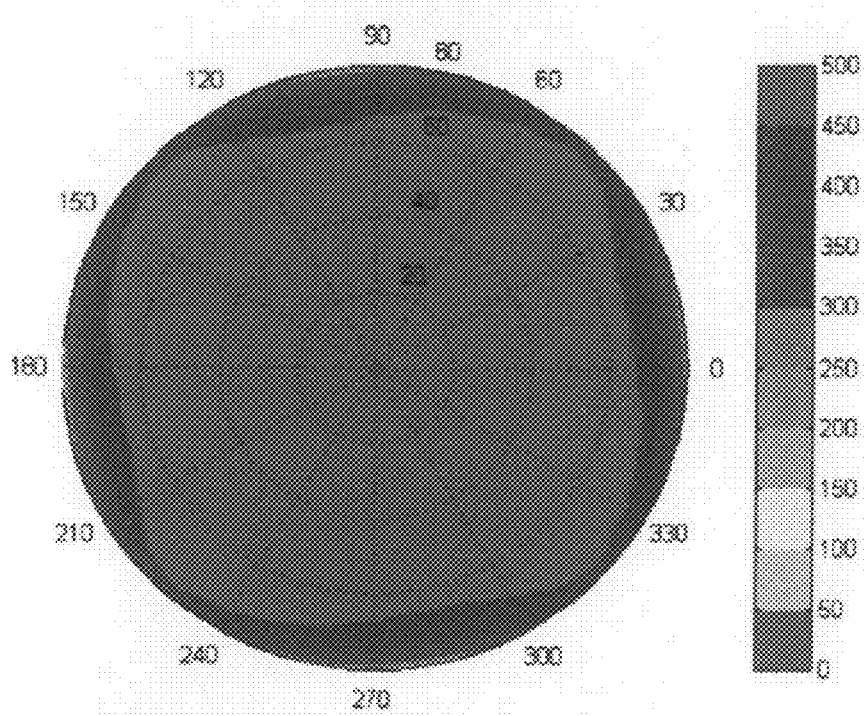

When a white light is used, the simulation result for the contrast characteristic of a third IPS-LCD structure including a viewing angle compensation film at an inclination angle of about 0° to 80° in all azimuthal angles is illustrated in FIG. 10.

INDUSTRIAL APPLICABILITY

As can be seen from the foregoing, the in-plane switching liquid crystal display according to the present invention uses the positive biaxial retardation film while adjusting the optical axis direction and the retardation value of the positive biaxial retardation film, so the in-plane switching liquid crystal display can improve the contrast characteristic at a predetermined angular position as well as at a front position thereof, so that a color shift according to the viewing angle in the black state can be minimized.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An in-plane switching liquid crystal display comprising:
   a first polarizer plate;
   a second polarizer plate; and
   a liquid crystal cell, which is horizontally aligned and filled with liquid crystal of positive dielectric anisotropy ($\Delta\epsilon>0$) or negative dielectric anisotropy ($\Delta\epsilon<0$), an optical axis of the liquid crystal filled in the liquid crystal cell being aligned in-plane in parallel to the first and second polarizer plates,
   wherein an absorption axis of the first polarizer plate is perpendicular to an absorption axis of the second polarizer plate, the optical axis of the liquid crystal filled in the liquid crystal cell is parallel to the absorption axis of the first polarizer plate, a first positive biaxial retardation film defined by a following Equation is aligned between the liquid crystal cell and the first polarizer plate, a second positive biaxial retardation film defined by the following Equation is aligned between the liquid crystal cell and the second polarizer plate, an optical axis of the first positive biaxial retardation film is parallel to the absorption axis of the first polarizer plate, an optical axis of the second positive biaxial retardation film is perpendicular to the absorption axis of the second polarizer plate an in-plane retardation value of the first positive biaxial retardation film is equal to or less than 190 nm at a wavelength of 550 nm, and an in-plane retardation value of the second positive biaxial retardation film is in a range of 150 nm to 350 nm at a wavelength of 550 nm,
   Equation
   $n_x \neq n_y < n_z$, wherein $n_x$ and $n_y$ are in-plane refractive indexes, $n_z$ is a thickness refractive index, and the positive biaxial retardation film has a positive in-plane retardation value ($R_{inh} = d \times (n_x - n_y)$) and a positive thickness retardation value ($R_{th} = d \times (n_z - n_y)$) in which d is a thickness of a film.

2. The in-plane switching liquid crystal display according to claim 1, wherein a retardation value of the liquid crystal cell is in a range of 200 nm to 400 nm at a wavelength of 550 nm.

3. The in-plane switching liquid crystal display according to claim 1, wherein the positive biaxial retardation film is used as a protective film for at least one polarizer plate.

4. The in-plane switching liquid crystal display according to claim 1, wherein an internal protective film of the first polarizer plate has a thickness retardation value of 0 or a negative thickness retardation value.

5. An in-plane switching liquid crystal display comprising:
   a first polarizer plate;
   a second polarizer plate; and
   a liquid crystal cell, which is horizontally aligned and filled with liquid crystal of positive dielectric anisotropy ($\Delta\epsilon>0$) or negative dielectric anisotropy ($\Delta\epsilon<0$), an optical axis of the liquid crystal filled in the liquid crystal cell being aligned in-plane in parallel to the first and second polarizer plates,
   wherein an absorption axis of the first polarizer plate is perpendicular to an absorption axis of the second polarizer plate, the optical axis of the liquid crystal filled in the liquid crystal cell is parallel to the absorption axis of the first polarizer plate, a first positive biaxial retardation film defined by a following Equation is aligned between the liquid crystal cell and the first polarizer plate, a second positive biaxial retardation film defined by the following Equation is aligned between the liquid crystal cell and the second polarizer plate, an optical axis of the first positive biaxial retardation film is parallel to the absorption axis of the first polarizer plate, an optical axis of the second positive biaxial retardation film is parallel to the absorption axis of the second polarizer plate, an in-plane retardation value of the first positive biaxial retardation film is equal to or less than 150 nm at a wavelength of 550 nm, and an in-plane retardation value of the second positive biaxial retardation film is in a range of 200 nm to 350 nm at a wavelength of 550 nm,
   Equation
   $n_x \neq n_y < n_z$, wherein $n_x$ and $n_y$ are in-plane refractive indexes, $n_z$ is a thickness refractive index, and the positive biaxial retardation film has a positive in-plane retardation value ($R_{in} = d \times (n_x - n_y)$) and a positive thickness retardation value ($R_{th} = d \times (n_z - n_y)$) in which d is a thickness of a film.

6. The in-plane switching liquid crystal display according to claim 5, wherein a retardation value of the liquid crystal cell is in a range of 200 nm to 400 nm at a wavelength of 550 nm.

7. The in-plane switching liquid crystal display according to claim 5, wherein the positive biaxial retardation film is used as a protective film for at least one polarizer plate.

8. The in-plane switching liquid crystal display according to claim 5, wherein an internal protective film of the first polarizer plate has a thickness retardation value of 0 or a negative thickness retardation value.

* * * * *